United States Patent [19]

Hickner

[11] 4,431,498

[45] Feb. 14, 1984

[54] RADIATION CURABLE WATER-MISCIBLE COMPOSITIONS OF VINYL ESTER RESINS

[75] Inventor: Richard A. Hickner, Lake Jackson, Tex.

[73] Assignee: The Dow Chemical Company, Midland, Mich.

[21] Appl. No.: 195,287

[22] Filed: Oct. 7, 1980

[51] Int. Cl.³ ............................................... C08F 2/50
[52] U.S. Cl. ........................ 204/159.23; 204/159.16; 526/320; 524/832
[58] Field of Search .................. 526/320; 204/159.23, 204/159.24; 525/922

[56] References Cited

U.S. PATENT DOCUMENTS

| | | | |
|---|---|---|---|
| 3,367,992 | 2/1968 | Bearden | 260/37 EP |
| 3,523,792 | 8/1970 | Delzenne et al. | 204/159.24 |
| 3,635,869 | 1/1972 | Steele et al. | 260/30.4 EP |
| 3,882,187 | 5/1975 | Takiyama et al. | 204/159.15 |
| 3,933,935 | 1/1976 | Zachariades et al. | 204/159.11 |
| 3,968,135 | 7/1976 | Steele et al. | 260/2 |
| 3,980,483 | 9/1976 | Nishikubo et al. | 204/159.15 |
| 4,040,925 | 8/1977 | McGinniss | 525/922 |
| 4,273,552 | 6/1981 | Nischwitz | 526/320 |
| 4,277,582 | 7/1981 | Mueller et al. | 526/320 |
| 4,322,328 | 3/1982 | Graetz et al. | 524/762 |

FOREIGN PATENT DOCUMENTS 1336816 11/1973 United Kingdom .

OTHER PUBLICATIONS

Lee et al., "Handbook of Epoxy Resins" McGraw-Hill, 1967, pp. 4-61.

*Primary Examiner*—John C. Bleutge
*Assistant Examiner*—A. H. Koeckert

[57] ABSTRACT

Radiation curable resin compositions of a water-miscible diacrylate of a diglycidyl ether of an aliphatic diol, which is a lower molecular weight alkanediol or a polyalkylene glycol are water dilutable to reduce the viscosity of the compositions.

8 Claims, No Drawings

RADIATION CURABLE WATER-MISCIBLE COMPOSITIONS OF VINYL ESTER RESINS

BACKGROUND OF THE INVENTION

Vinyl ester resins are a well-known class of materials that result from the esterification of a polyepoxide, usually a diepoxide, with an unsaturated monocarboxylic acid, such as acrylic or methacrylic acid. Those vinyl ester resins are usually highly viscous liquids requiring addition of a monomer, such as styrene, to lower the viscosity to a workable level. During cure, some of the monomer is volatilized. This changes the composition of the cured coating from that which was applied. Also, the escaping organic monomer is environmentally unacceptable.

It would be desirable to have a water-thinnable vinyl ester resin composition that would retain the characteristic properties of those resins.

SUMMARY OF THE INVENTION

Water-thinnable radiation curable compositions comprise a diacrylate of a diglycidyl ether of an aliphatic diol which is a lower molecular weight alkanediol or a polyalkylene glycol, the glycol portion of which has a molecular weight of up to about 1,000, plus water and, optionally, an unsaturated monomer such as methylol acrylamide.

DETAILED DESCRIPTION OF THE INVENTION

The vinyl ester resins useful herein are those water-miscible unsaturated esters of an unsaturated monocarboxylic acid and a diglycidyl ether of an aliphatic diol. When that diol is a polyalkylene glycol, the alkylene glycol is either ethylene glycol or propylene glycol. In order to have water miscibility in the ultimate vinyl ester resin, the polyalkylene glycol should have a molecular weight of less than about 1,000.

The diglycidyl ethers of such alkylene glycols are readily prepared by reacting the glycol with epichlorohydrin followed by treatment with a base, such as sodium hydroxide, to form the epoxy group.

The diglycidyl ether may also be made from a lower molecular weight alkanediol, such as butane-1,4-diol.

A minor portion of the glycidyl ether may be replaced by other polyepoxides such as the diglycidyl ether of bisphenol A without losing the requisite water miscibility.

Acrylic and methacrylic acids are the most common unsaturated monocarboxylic acids and are preferred herein. Various other unsaturated acids may be used, although such other acids may reduce the water miscibility of the resulting ester.

The acid and the glycidyl ether are generally reacted in about equivalent amounts, i.e., about one acid group for each epoxy group. A small excess of either reactant may be employed. It is preferred to heat the reactants to a temperature of about 115° to 118° C. Catalysts for the epoxide/carboxylic acid reaction are known and include, for example, trivalent chromium salts or a tertiary amine such as tris(N,N-dimethylaminomethyl)phenol.

The resulting resin may be employed and cured by itself. To achieve a workable viscosity, it may be thinned or diluted with water to the desired consistency. Water-soluble monomers may be used for dilution as a partial replacement for some of the water. Typical of such monomers are the hydroxyalkyl acrylates, such as hydroxyethyl acrylate or hydroxypropyl acrylate, or acrylamide derivatives, such as N-methylol acrylamide. When so used, the monomer can be used in considerably less amount than would be necessary if it was the sole diluent. Consequently, the adverse effects of the inclusion of large amounts of an organic monomer are minimized.

The aqueous vinyl ester resin composition is radiation curable by either ionizing radiation or actinic light.

The term "ionizing radiation" as used herein means high energy radiation and/or the secondary energies resulting from conversion of electron or other particle energy to neutron or gamma radiation. While various types of ionizing radiation are suitable for this purpose, such as X-ray and gamma and beta rays, the radiation produced by accelerated high energy electrons has been found to be very conveniently and economically applicable and to give very satisfactory results.

The compositions may also be cured by exposure to actinic light. Although curable, per se, the cure is aided and accelerated by the use of known photoinitiators, such as benzoin ethers, benzophenone, hydroxybenzophenone, Michlers ketone.

The compositions can be made curable to visible light by the inclusion therein of a small amount of certain organic dyes as photosensitizers for the photoinitiators. Generally, those dyes which are useful are those of the classes of cationic and basic dyes. The photosensitizer is usually effective when used in a concentration of from about 0.001 percent to about 3 percent of the weight of the photoinitiator.

It is also possible to employ a combination of curing techniques simultaneously or in sequence. For example, the composition may be first subjected to ionizing radiation and then followed by a photocure of the surface.

The compositions are of particular use as coatings that can be radiation cured on a wide variety of substrates, such as paper, wood, glass, aluminum, tin plate, plastic and primed steel.

The concept of the invention will be more apparent from the following illustrative examples wherein all parts and percentages are by weight unless otherwise indicated.

EXAMPLE 1

A blend of 90 mole percent of the diglycidyl ether of dipropylene glycol and 10 mole percent of the diglycidyl ether of bisphenol A was prepared. The diacrylate was prepared by reacting the stoichiometric amount of acrylic acid with the blend. To 13.5 grams of the diacrylate were added 13.5 grams of a 60 percent aqueous solution of N-methylol acrylamide and 3 grams water to form a clear solution. Five parts of a 50/50 blend of N,N-dimethylaniline/benzophenone were mixed into the solution.

A film was drawn down on a Bonderite 37 panel using a No. 14 Meier rod. The film cured to a hard glossy coating after three passes under a 200 watt per inch medium pressure Hannovia lamp.

EXAMPLE 2

Solutions were prepared using the above resin and varying ratios of N-methylol acrylamide and water.

|  | Solution A | Solution B | Solution C |
|---|---|---|---|
| G resin | 35 | 25 | 15 |
| G N—MAAm | 15 | 25 | 35 |
| G H₂O | 6 | 10 | 14 |
| Net wt. % H₂O | 12 | 20 | 28 |
| Viscosity - cks | 165 | 50 | 22 |

The solutions were photoinitiated using 5 percent of a ½ mixture of Vicure® 10 (a benzoin ether)/N-methyldiethanol amine or benzophenone/N,N-dimethylaniline and cured by passing under a Linde unit (Line Division, UCC) containing three 100 watt medium pressure mercury lamps. The following properties were obtained on Bonderite 37.

|  | Solution A | | Solution B | | Solution C | |
|---|---|---|---|---|---|---|
|  | V-10[1]/MDEOA[2] | BP[3]/DMA[4] | V-10/MDEOA | BP/DMA | V-10/MDEOA | BP/DMA |
| Passes to Cure | 2 | — | 4 | 1 | 2 | 2 |
| MEK Double Rubs | Pass 100 | — | — | Pass 100 | Pass 100 | — |
| Reverse Impact (in/lbs) | Fail 40 | — | — | Pass 40 | Pass 100 | Pass 100 |

[1] V-10 = Vicure-10
[2] MDEOA = N—methyldiethanolamine
[3] BP = benzophenone
[4] DMA = N—dimethylaniline.

What is claimed is:

1. A radiation curable, water-miscible resin composition comprising (1) a nonionic water-miscible diacrylate of a diglycidyl ether of an aliphatic diol, said diol being a lower molecular weight alkanediol or a polyalkylene glycol, said glycol having a molecular weight of less than 1,000, said diacrylate containing no free carboxyl groups or salts thereof and (2) water in an amount to significantly reduce the viscosity of said composition.

2. The resin composition of claim 1 wherein said polyalkylene glycol is polyethylene glycol.

3. The resin composition of claim 1 wherein said polyalkylene glycol is polypropylene glycol.

4. The resin composition of claim 1 including a water-miscible reactive diluent.

5. The resin composition of claim 4 wherein said reactive diluent is a hydroxyalkyl acrylate.

6. The resin composition of claim 5 wherein said hydroxyalkyl acrylate is hydroxyethyl acrylate.

7. The resin composition of claim 4 wherein said reactive diluent is N-methylol acrylamide.

8. The resin composition of claim 1 also containing an ultraviolet light activatable catalyst.

* * * * *